(12) United States Patent
Shibazaki et al.

(10) Patent No.: US 7,362,306 B2
(45) Date of Patent: Apr. 22, 2008

(54) IMAGE DISPLAYING DEVICE

(75) Inventors: Ken Shibazaki, Miyagi-ken (JP); Ken Matsumoto, Iwate-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 739 days.

(21) Appl. No.: 10/800,960

(22) Filed: Mar. 15, 2004

(65) Prior Publication Data

US 2004/0183779 A1 Sep. 23, 2004

(30) Foreign Application Priority Data

Mar. 19, 2003 (JP) .............................. 2003-076083

(51) Int. Cl.
*G09G 5/08* (2006.01)

(52) U.S. Cl. ...................... 345/157; 345/158; 345/159; 345/161; 345/162

(58) Field of Classification Search ................ 345/157, 345/158, 159, 161, 162
See application file for complete search history.

(56) References Cited

U.S. PATENT DOCUMENTS 5,305,238 A * 4/1994 Starr et al. ................... 702/176

6,987,508 B2 * 1/2006 Numata et al. .............. 345/184
2002/0054019 A1 * 5/2002 Rosenberg et al. .......... 345/157

FOREIGN PATENT DOCUMENTS

JP 2001-84875 3/2001

* cited by examiner

*Primary Examiner*—Richard Hjerpe
*Assistant Examiner*—Leonid Shapiro
(74) *Attorney, Agent, or Firm*—Brinks Hofer Gilson & Lione

(57) ABSTRACT

An image displaying device includes a display unit which displays a cursor and at least one button; an input unit for moving the cursor and for selecting the button; and a controller for controlling the display unit and the input unit. The input unit is provided with an operating part operated by an operator, at least one position sensor which detects an operation state of the operating part, and at least one actuator which applies a specific external force to the operating part. When a display screen of the display unit is switched, the controller drives the actuator to move the cursor to a default position set in the switched display screen. In that case, the moving rate of the cursor is set lower than a moving rate of the cursor for pulling the cursor towards the center of the button.

6 Claims, 4 Drawing Sheets

IMAGE DISPLAYING DEVICE

This application claims the benefit of priority to Japanese Patent Application No. 2003-76083, herein incorporated by reference.

BACKGROUND OF THE INVENTION

1. Field of the Invention

The present invention relates to image displaying devices in which buttons displayed on display screens of display units are selected by cursors to switch the display screens, and particularly, to an image displaying device having an automatic function for pulling a cursor towards the center of a button when the cursor approaches to an area having a predetermined radius from the display position of the button.

2. Description of the Related Art

Conventionally, for central control devices for in-vehicle electronic apparatuses, for example, an image displaying device, such as the one disclosed in Japanese Unexamined Patent Application Publication No. 2001-84875 shown (refer to FIG. 3), which includes a display unit that displays a cursor and one or multiple buttons, an input unit for moving the cursor and for selecting a button, and a controller for controlling the display unit and the input unit has been proposed. In such a device, the cursor is moved to a display position of the desired button to select the button so that a display screen of the display unit is switched to a screen corresponding to the selected button.

For example, in a central control device for in-vehicle electronic apparatuses, an initial screen displays a cursor and buttons which indicate types of in-vehicle electronic apparatuses, such as air conditioners, CD players, radios, and car navigation systems, that are controllable by the central control device. If an air conditioner button is selected, for example, a subsequent screen may display a cursor and buttons which indicate adjustment options of the air conditioner for, for example, temperature, air flow, and nozzles. Subsequently, if the temperature button is selected, for example, a subsequent screen may then display a cursor, a raise-temperature button, and a lower-temperature button. By operating the raise-temperature button or the lower-temperature button, the preset temperature of the air conditioner may be changed.

A cursor on a display screen is manually operated using an operating part, such as a joystick, provided in the input unit. For this reason, for an image displaying device, such as a central control device for in-vehicle electronic apparatuses, that is used in an environment where the device may receive external vibrations, it is not necessarily easy to move the cursor accurately and promptly to the desired button. To enable easier selection of the desired button, it is desirable that, when the operation of the input unit allows the cursor to approach within a predetermined range from the center of the button, the cursor is pulled automatically to the center of the button.

Although technology for pulling cursors is common in the technical field of information processing devices, it has been proved that mere application of such a technology to image displaying devices may cause the following disadvantage.

In detail, when the display screen of the display unit is switched from a previous screen to its following screen, if the position of the cursor in the previous screen is near a set position of a button in the following screen, the operating part provided in the input unit is driven abruptly in response to the pulling of the cursor. This may tend to cause sense of discomfort and uneasiness for the operator, and moreover, may cause selection of an undesired button.

SUMMARY OF THE INVENTION

Accordingly, it is an object of the present invention to solve the conventional problems mentioned above by providing a highly operational and reliable image displaying device that is capable of controlling the pulling of a cursor during a screen change.

An image displaying device according to the present invention includes a display unit which displays a cursor and at least one button; an input unit for moving the cursor and for selecting the button; and a controller for controlling the display unit and the input unit. The input unit is provided with an operating part operated by an operator, at least one position sensor that detects an operation state of the operating part, and at least one actuator that applies a specific external force to the operating part. The controller calculates the operated distance and the operated direction of the operating part based on at least one position signal output from the position sensor and moves the cursor based on the calculated operated distance and the calculated operated direction of the operating part. When a display screen of the display unit is switched, the actuator is driven so as to move the cursor to a default position set in the switched display screen at a predetermined moving rate.

Accordingly, when the display screen of the display unit is switched, the actuator is driven so that the cursor is moved to the default position set in the switched display screen at the predetermined moving rate. Even when the position of the cursor in the previous screen is near the set position of the button in the following screen, pulling of the cursor towards the button is prevented. This reduces the sense of discomfort and uneasiness for the operator and prevents selection of an undesired button to allow smooth operation of the operating part, thus enhancing operability and reliability of the image displaying device.

In the image displaying device of the present invention, during an operation of the operating part, when the cursor is moved to an area having a predetermined radius from the center of the button, the actuator may be driven to pull the cursor to the center of the button.

Accordingly, since the actuator is driven to pull the cursor to the center of the button when the cursor is moved the area having the predetermined radius from the center of the button during operation of the operating part, the cursor may accurately and promptly be moved to the desired button even if the image displaying device is being used in an environment where the device may receive external vibrations. Thus, the operability of the image displaying device may further be enhanced.

In the image displaying device of the present invention, the predetermined moving rate may be set lower than a moving rate of the cursor for pulling the cursor towards the center of the button.

Accordingly, by setting the moving rate for moving the cursor to the default position lower than the moving rate for pulling the cursor towards the center of the button, smooth operation of the cursor, i.e. the operating part, during a screen change may be achieved. This may reduce the sense of discomfort and uneasiness for the operator, thus further enhancing the operability and reliability of the image displaying device.

In the image displaying device of the present invention, the switched display screen may include a plurality of the default positions so that when the display screen of the display unit is switched, the cursor is moved to the nearest one of the default positions.

Accordingly, by providing multiple default positions on the switched display screen, the cursor may be moved to the nearest default position when the display screen of the display unit is switched. Thus, the moving distance of the operating part corresponding to the moving of the cursor may be decreased to further reduce the sense of discomfort and uneasiness for the operator and to shorten the moving time of the cursor C to the default position. Thus, the operability and reliability of the image displaying device may further be enhanced.

In the image displaying device of the present invention, when the cursor is pulled to the center of the button, the controller may drive the actuator to impart specific force feedback, which corresponds to the button, to the operating part.

Accordingly, by driving the actuator to impart specific force feedback, corresponding to the button, to the operating part when the cursor is pulled to the center of the button, the operator is able to haptically sense whether the cursor is positioned at the corresponding button without looking. Thus, the operability of the image displaying device may further be enhanced.

As described above, in the image displaying device of the present invention, when the display screen of the display unit is being switched, the actuators are driven to move the cursor to the default position set in the switched display screen. In this case, because the moving rate of the cursor is set lower than the moving rate of the cursor for pulling the cursor towards the center of one of the buttons, even when the position of the cursor in the previous screen is near the set positions of the buttons in the following screen, the pulling of the cursor towards the buttons is prevented. This reduces the sense of discomfort and uneasiness for the operator and prevents selection of an undesired button to allow smooth operation of the operating part. Thus, the operability and reliability of the image displaying device are enhanced.

DESCRIPTION OF THE PREFERRED EMBODIMENTS

Figure 1:
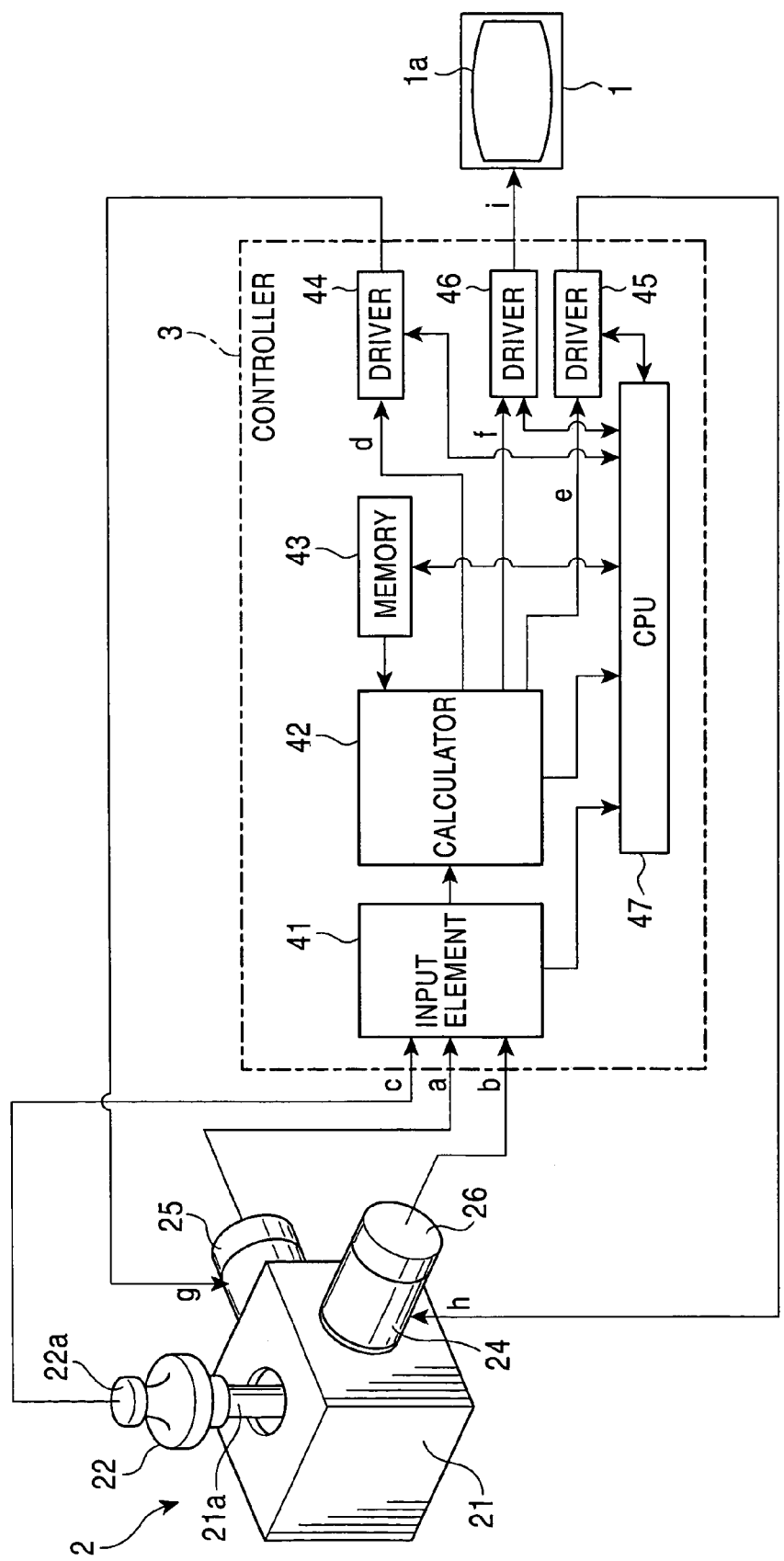
FIG. 1 is a schematic diagram of an image displaying device according to an embodiment.
Figure 2:
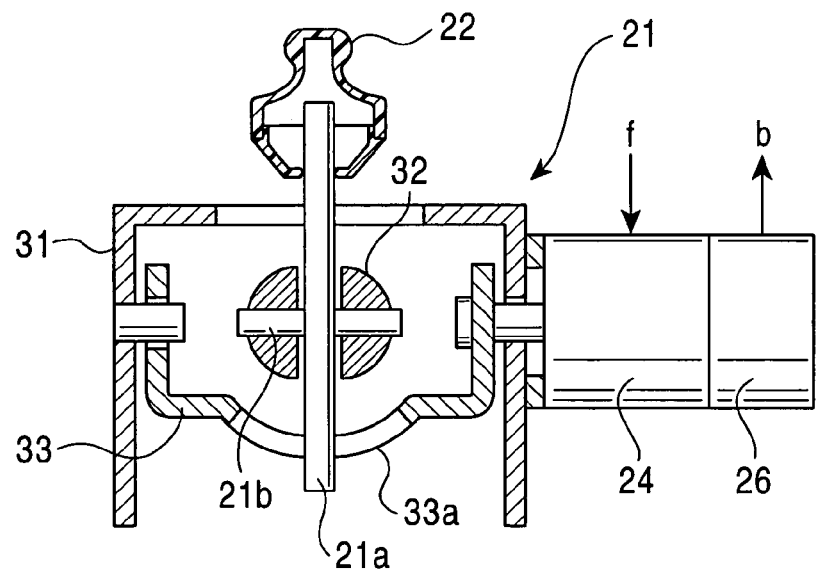
FIG. 2 is a cross-sectional side view of an input unit according to the embodiment.
Figure 3:
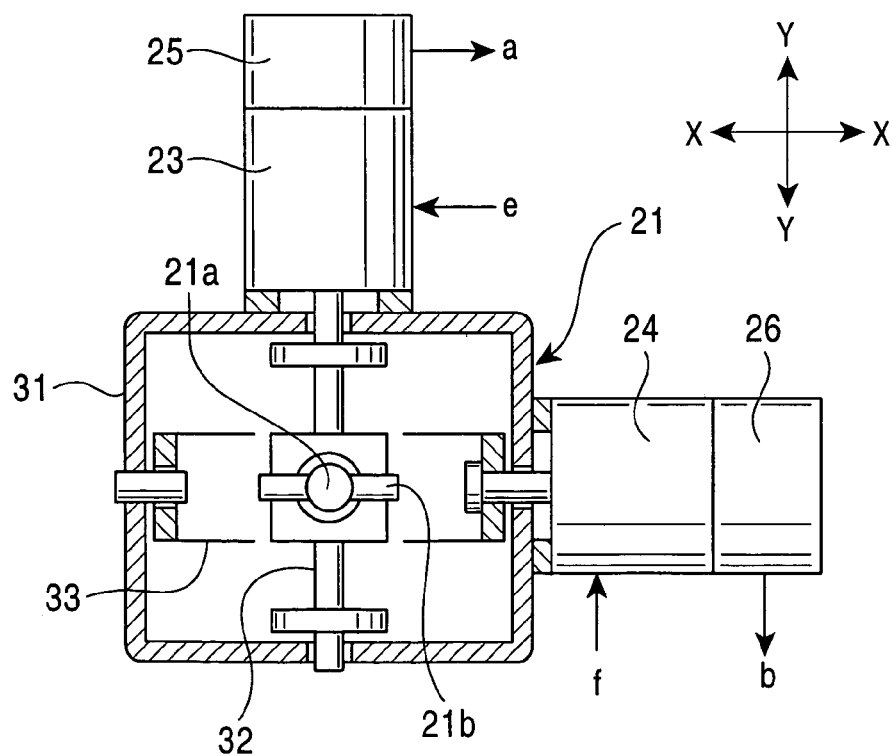
FIG. 3 is a cross-sectional plan view of the input unit according to the embodiment.
Figure 4A:
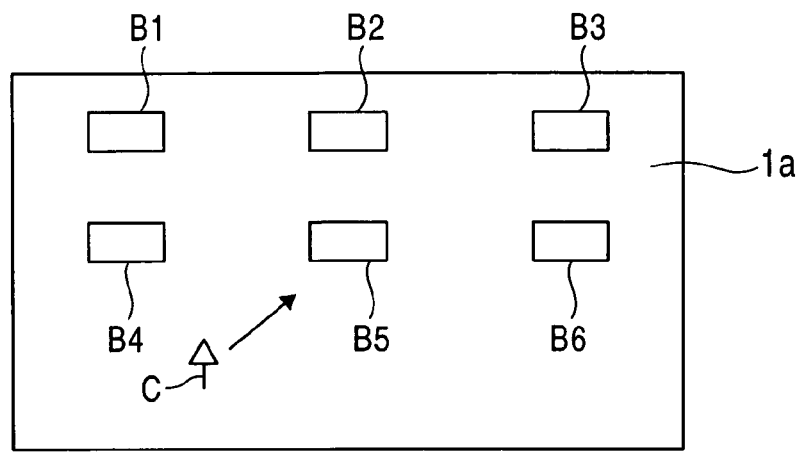
FIGS. 4A, 4B, and 4C are schematic operational diagrams of the image displaying device according to the embodiment.
Figure 4B:
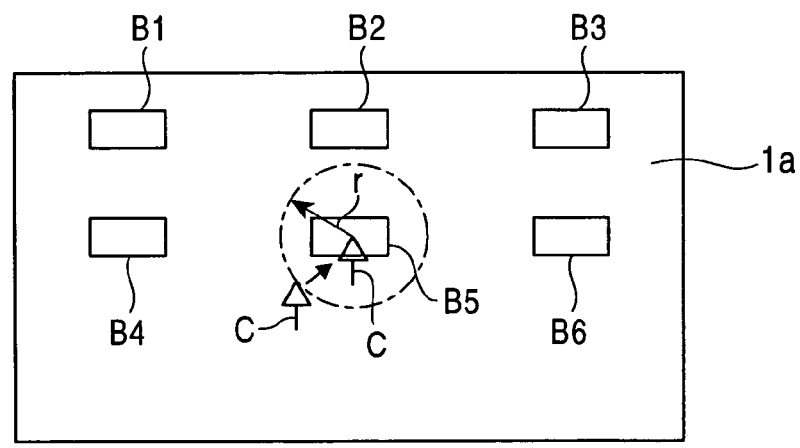
Figure 4C:
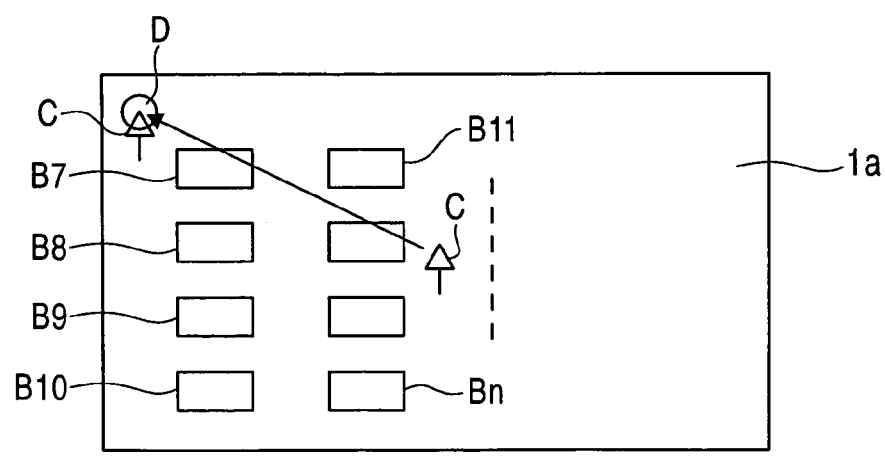
Figure 5:
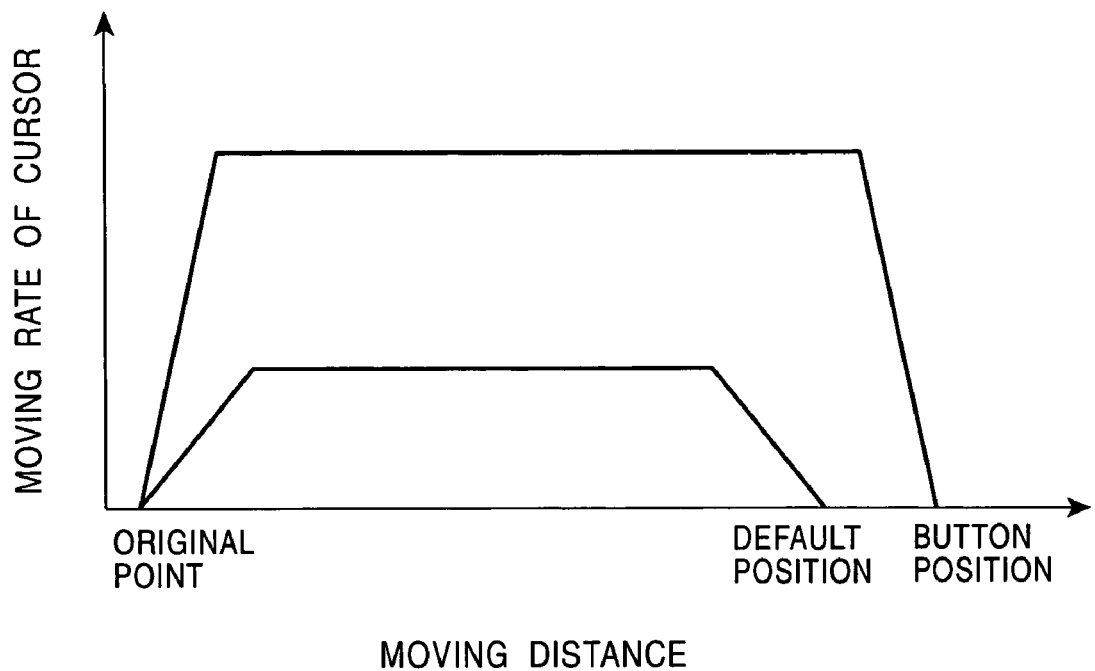
FIG. 5 is a graph describing the moving rate of a cursor in the image displaying device according to the embodiment.

An image displaying device according to an embodiment of the present invention will now be described with reference to FIG. 1 to FIG. 5. FIG. 1 is a schematic diagram of the image displaying device according to the embodiment. FIG. 2 is a cross-sectional side view of an input unit 2 according to the embodiment. FIG. 3 is a cross-sectional plan view of the input unit 2. FIGS. 4A, 4B, and 4C are schematic operational diagrams of the image displaying device. FIG. 5 is a graph illustrating the moving rate of a cursor C.

Referring to FIG. 1, the image displaying device of this embodiment is mainly provided with a display unit 1 which displays a specific image that includes the cursor C (refer to FIGS. 4A to 4C) and one button or a plurality of buttons B1 to Bn (also refer to FIGS. 4A to 4C); the input unit 2 for moving the cursor C displayed in the display unit 1 and for selecting the buttons B1 to Bn displayed in the display unit 1; and a controller 3 for controlling the display unit 1 and the input unit 2.

Although any known display units may be used for the display unit 1, a liquid crystal display unit is preferable since such a unit is relatively cheap and can be manufactured in a small size.

Referring to FIGS. 1 to 3, the input unit 2 includes a mechanical component 21 provided with a tilt lever 21a; an operating part 22 attached to the upper tip of the tilt lever 21a, first and second actuators 23 and 24 for imparting force feedback to the operating part 22 via the tilt lever 21a, and first and second position sensors 25 and 26 for detecting the operated direction and the operated distance of the tilt lever 21a.

As shown in FIG. 2 and FIG. 3, in addition to the tilt lever 21a, the mechanical component 21 is further provided with a casing 31, and a lever supporting shaft 32 and a swing arm 33 both of which are supported by the casing 31 in a rotatable manner. The lever supporting shaft 32 and the swing arm 33 are disposed perpendicular to each other. The tilt lever 21a is attached to the lever supporting shaft 32 so as to be rotatable only in the directions of the rotation of the swing arm 33. The tilt lever 21a has a central rotary shaft 21b. The swing arm 33 has a slit opening 33a through which the lower tip of the tilt lever 21a extends. The slit opening 33a has a width that is slightly larger than the diameter of the lower tip of the tilt lever 21a. If the tilt lever 21a is tilted in the rotational direction of the lever supporting shaft 32, i.e. the X-X direction in FIG. 3, the lower tip of the tilt lever 21a is slideable freely within the slit opening 33a. If the tilt lever 21a is tilted in the rotational direction of the central rotary shaft 21b, i.e. the Y-Y direction in FIG. 3, the swing arm 33 swings together with the tilt lever 21a.

According to these structures, the tilt lever 21a may be tilted in any direction with respect to the lever supporting shaft 32 and the central rotary shaft 21b. The lever supporting shaft 32 is rotated in the tilting direction of the tilt lever 21a at an amount of rotation proportional to the amount of tilting of the tilt lever 21a in the X-X direction. The swing arm 33 is rotated in the tilting direction of the tilt lever 21a at an amount of rotation proportional to the amount of tilting of the tilt lever 21a in the Y-Y direction.

The operating part 22 has a shape and size that can be manipulated by the operator. A portion of the operating part 22 is provided with a selection switch 22a for the buttons B1 to Bn displayed in the display unit 1.

The first actuator 23 is connected with the lever supporting shaft 32. The second actuator 24 is connected with the swing arm 33. For these first and second actuators 23 and 24, an electrically-driven element, such as a motor or a solenoid, may be used. If a direct-driven element, such as a linear motor and a solenoid, is used as the actuators 23 and 24, a certain power transmission mechanism is provided between the actuator 23 and the lever supporting shaft 32 or between the actuator 24 and the swing arm 33. Such a power transmission mechanism may convert the rotary motion of the lever supporting shaft 32 or the swing arm 33 to linear motion for transmission.

The first position sensor 25 has a rotary shaft which is connected with the lever supporting shaft 32. The second position sensor 26 has a rotary shaft which is connected with the swing arm 33. Each of the first and second position sensors 25 and 26 detects the direction and amount of rotation of the corresponding rotary shaft, and correspondingly converts the direction and amount of rotation to an electrical signal to be outputted. For example, a rotary encoder or a rotary variable resistor may be used as the position sensors 25 and 26.

Referring to FIG. 1, the controller 3 includes an input element 41 which receives a first position signal a output from the first position sensor 25, a second position signal b output from the second position sensor 26, and a switch signal c output from the selection switch 22a; a calculator 42 which calculates the moving direction and the moving distance of the cursor C based on the first and second position signals a and b received from the input element 41, calculates driving signals d and e for the first and second actuators 23 and 24 based on the first and second position signals a and b, generates a display-unit driving signal f for the display unit 1, and switches a display screen based on the switch signal c received from the input element 41; a memory 43 which stores, for example, numerical formula and coefficients for the basis of calculation, and the pull-start position and the pull-end position of the cursor C; first and second driver circuits 44 and 45 which output actuator-driving-power g and h in response to the respective actuator driving signals d and e output from the calculator 42 so as to drive the first and second actuators 23 and 24; a third driver circuit 46 which outputs display-unit driving power i in response to the display-unit driving signal f output from the calculator 42 so as to drive the display unit 1; and a CPU 47 for controlling these elements 41 to 46.

Referring to FIG. 4A, when the operating part 22 is being operated, the calculator 42 calculates the moving direction and the moving distance of the cursor C displayed in the display unit 1 based on, for example, the first position signal a, the second position signal b, and the numerical formula and coefficients stored in the memory 43. Based on the calculation result, the cursor C displayed in the display unit 1 is moved in a direction corresponding to the operated direction of the operating part 22 and by a distance corresponding to the operated distance of the operating part 22.

Furthermore, referring to FIG. 4B, if the cursor C is moved to within a predetermined range having a radius r from the center of one of the buttons B1 to Bn, the calculator 42 drives the actuators 23 and 24 so that the cursor C is pulled to the center of the corresponding button. In that case, the actuators 23 and 24 driven by the calculator 42 impart specific force feedback, corresponding to one of the buttons B1 to Bn to which the cursor is pulled, to the operating part 22 so that the operator can haptically determine whether or not the cursor C is pulled to the desired button without looking. As a technology for imparting specific force feedback to the operating part 22, the technology in Japanese Unexamined Patent Application Publication No. 2002-149324, which has previously been disclosed by the present applicant, may be employed. The actuator control system, the manual operating part 3, the actuator 14, and the encoder 25, respectively, described in this publicly-released document correspond to the controller 3, the operating part 22, the first and second actuators 23 and 24, and the first and second position sensors 25 and 26 of the present application.

Referring to FIG. 4C, when one of the buttons B1 to Bn is selected by the operation of the selection switch 22a, the calculator 42 switches a display screen 1a of the display unit 1 to a subsequent screen that corresponds to the button. The calculator 42 then drives the actuators 23 and 24 so that the cursor C is pulled to a default position D set in the switched display screen 1a. In this case, referring to FIG. 5, the pulling rate of the cursor C is set lower than the pulling rate for pulling the cursor C towards the center of one of the buttons B1 to Bn.

In the image displaying device according to this embodiment, when the display screen 1a of the display unit 1 is switched, the actuators 23 and 24 are driven to move the cursor C to the default position D set in the switched display screen. Because the moving rate of the cursor C in that case is set lower than the moving rate of the cursor C for pulling the cursor C towards the center of one of the buttons B1 to Bn, even when the position of the cursor C in the previous screen is near the set positions of the buttons B1 to Bn in the following screen, the pulling of the cursor C towards the buttons B1 to Bn is prevented. This reduces the sense of discomfort and uneasiness for the operator and prevents selection of an undesired one of the buttons B1 to Bn so as to allow smooth operation of the operating part 22. Thus, the operability and reliability of the image displaying device are enhanced.

Furthermore, in the image displaying device of this embodiment, when the cursor C is pulled towards the center of one of the buttons B1 to Bn, the actuators 23 and 24 are driven to impart specific force feedback, provided for each one of the buttons B1 to Bn, to the operating part 22 so that the operator is able to haptically sense whether the cursor C is positioned at the corresponding button without looking. Accordingly, the operability of the image displaying device is enhanced.

Figure 6:
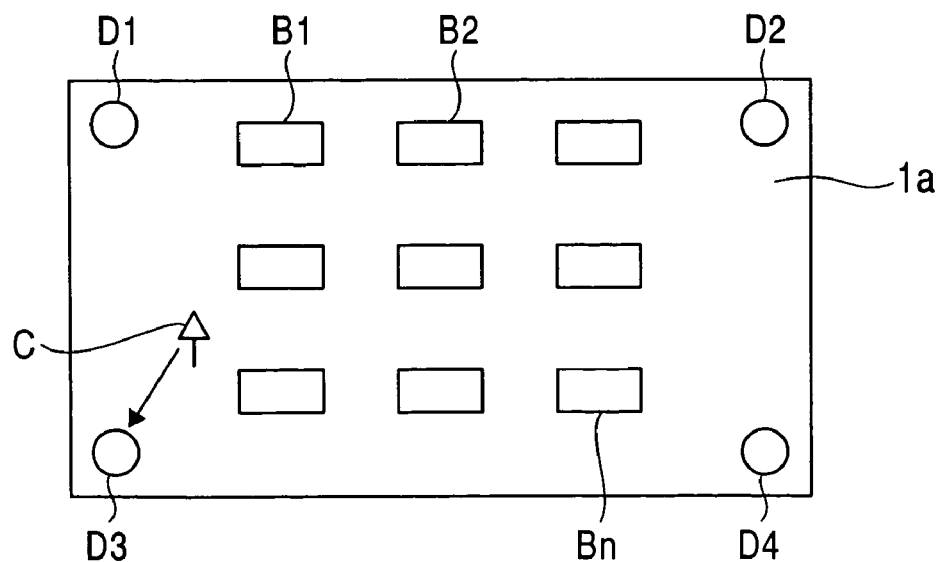
FIG. 6 is a schematic diagram of a screen of the image displaying device according to another embodiment.

Although only one default position D is provided in a subsequent screen in the above embodiment, a plurality of default positions D1 to D4 in a subsequent screen may alternatively be provided, as shown in FIG. 6, so that when the display screen 1a of the display unit 1 is switched, the cursor C may be moved to the nearest one of the default positions D1 to D4.

Accordingly, the moving distance of the operating part 22 corresponding to the movement of the cursor C may be decreased to further reduce the sense of discomfort and uneasiness for the operator and to shorten the moving time of the cursor C to one of the default positions D1 to D4. Thus, the operability and reliability of the image displaying device are further enhanced.

What is claimed is:

1. An image displaying device comprising:
a display unit which displays a cursor and at least one button;
an input unit for moving the cursor and for selecting said at least one button; and
a controller for controlling the display unit and the input unit,
wherein the input unit comprises an operating part operated by an operator, at least one position sensor that detects an operation state of the operating part, and at least one actuator that applies a specific external force to the operating part,
wherein the controller calculates an operated distance and an operated direction of the operating part based on at least one position signal output from said at least one position sensor, and moves the cursor based on the calculated operated distance and the calculated operated direction of the operating part, and wherein, when a display screen of the display unit is switched, said at least one actuator is driven to move the operating part so as to move the cursor to a default position set in the switched display screen at a predetermined moving rate.

2. The image displaying device according to claim 1, wherein, during an operation of the operating part, when the cursor is moved to an area having a predetermined radius from a center of said at least one button, said at least one actuator is driven to pull the cursor to the center of said at least one button.

3. The image displaying device according to claim 2, wherein the predetermined moving rate is lower than a moving rate of the cursor for pulling the cursor towards the center of said at least one button.

4. The image displaying device according to claim 1, wherein the switched display screen includes a plurality of the default positions so that when the display screen of the display unit is switched, the cursor is moved to the nearest one of the default positions.

5. The image displaying device according to claim 2, wherein, when the cursor is pulled to the center of said at least one button, the controller drives said at least one actuator to impart specific force feedback, which corresponds to said at least one button, to the operating part.

6. An image displaying device comprising:
a display unit which displays a cursor and at least one button;
an input unit for moving the cursor and for selecting said at least one button; and
a controller for controlling the display unit and the input unit,
wherein the input unit comprises an operating part operated by an operator, at least one position sensor that detects an operation state of the operating part, and at least one actuator that applies a specific external force to the operating part,
wherein the controller calculates an operated distance and an operated direction of the operating part based on at least one position signal output from said at least one position sensor, and moves the cursor based on the calculated operated distance and the calculated operated direction of the operating part,
wherein, when a display screen of the display unit is switched, said at least one actuator is driven to move the cursor to a default position set in the switched display screen at a predetermined moving rate, and
wherein the switched display screen includes a plurality of the default positions so that when the display screen of the display unit is switched, the cursor is moved to the nearest one of the default positions.

* * * * *